Inventor
Domenico Contiguglia

Inventor
Domenico Contiguglia

Inventor
Domenico Contiguglia

Patented June 20, 1950

2,512,223

UNITED STATES PATENT OFFICE 2,512,223

COMBINATION COOKER AND GRILL

Domenico Contiguglia, Medford, Mass.

Application May 29, 1947, Serial No. 751,177

1 Claim. (Cl. 99—339)

This invention relates generally to stoves, and more particularly to a combination cooker and grill which is adapted to be disassembled and packed into a limited space such as an automobile trunk, the device being specially designed for use in barbecuing and grilling food out-of-doors as at beach resorts and camps.

It is a primary object of this invention to provide a stove of this character which can be easily disassembled, no one part thereof being of great size, the device being quickly erectible and adjusted for use in barbecuing, grilling or baking food, or for carrying out all these preliminary operations simultaneously.

Another object of this invention is to provide a device of this character in which the skewer is positionally adjustable with reference to the fire box, and easily removable from the remaining portions of the stove, so that different rates of roasting may be used, this adjustability also allowing for variation in the heat of the fire.

Another object of this invention is to provide a novel grill plate arrangement allowing this grill plate to be used as a table, as in the preparation of food other than the actual cooking thereof.

Still another object of this invention is to provide a device of this character in which the various elements thereof are of novel and improved design and are combined and arranged in a novel manner.

And a last object to be specifically mentioned is to provide a device of this character which is relatively inexpensive and practicable to manufacture, extremely simple and convenient to use, and which will give generally efficient and durable service.

With these objects definitely in view, this invention resides in certain novel features of construction, combination and arrangement of parts and portions as will be hereinafter described in detail in the specification, and particularly pointed out in the claim hereunto appended, and illustrated in the accompanying drawings which form a material part of this application, and in which:

Similar characters of reference designate similar or identical parts and portions throughout the specification and throughout the several views of the drawings.

Figure 1:
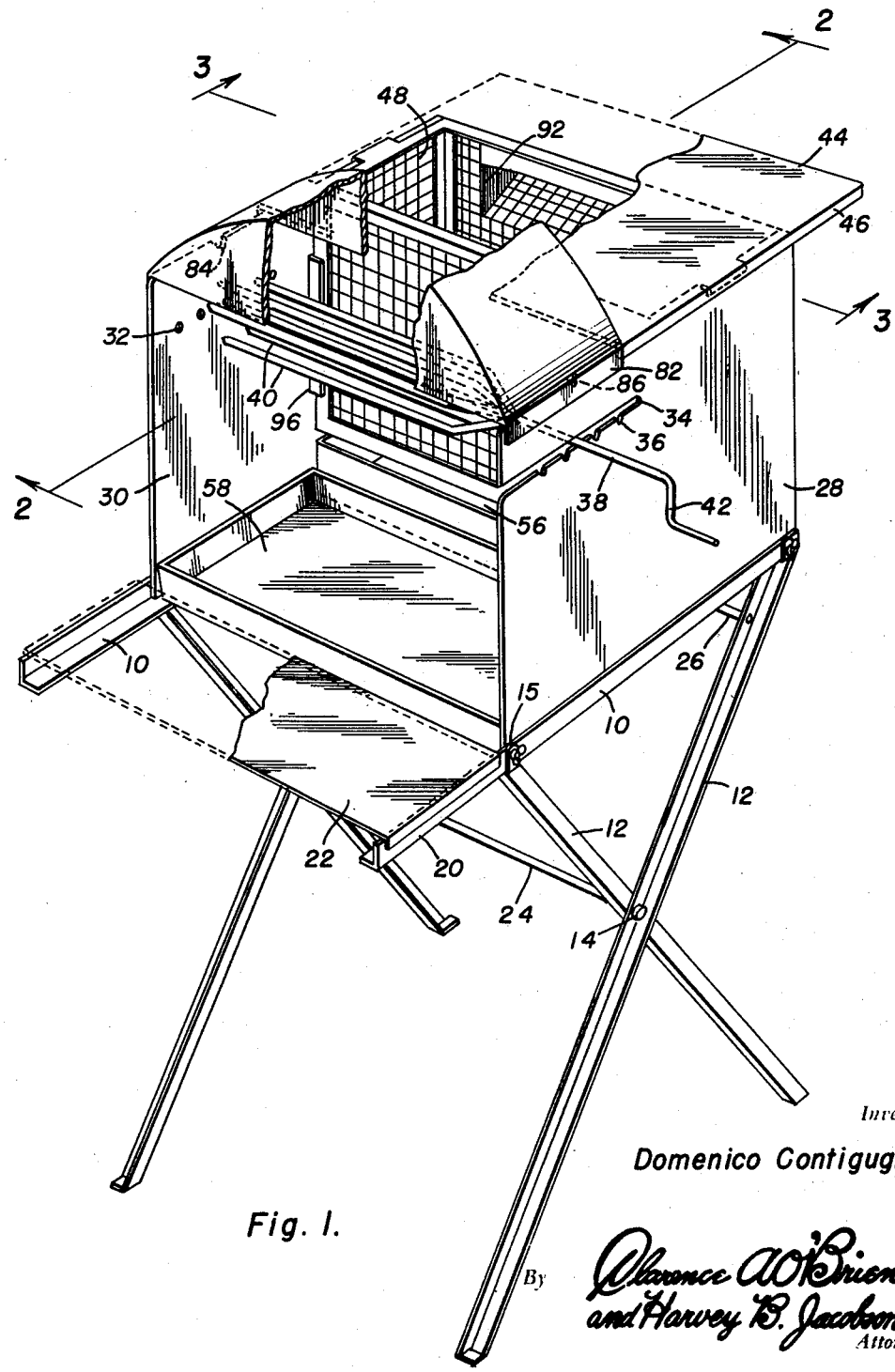
Figure 1 is a view of the assembled stove, with the oven removed, portions of the structure being cut away and the underlying portions shown in section and in elevation, to facilitate the illustration and to amplify the disclosure of this invention, the figure being a perspective view taken from what will be considered the front of the device.
Figure 2:
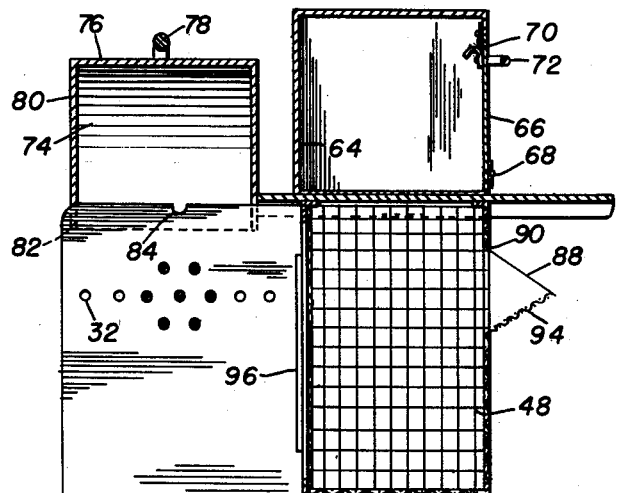
Figure 2 is a vertical sectional view, taken on the line 2—2 in Figure 1.
Figure 3:
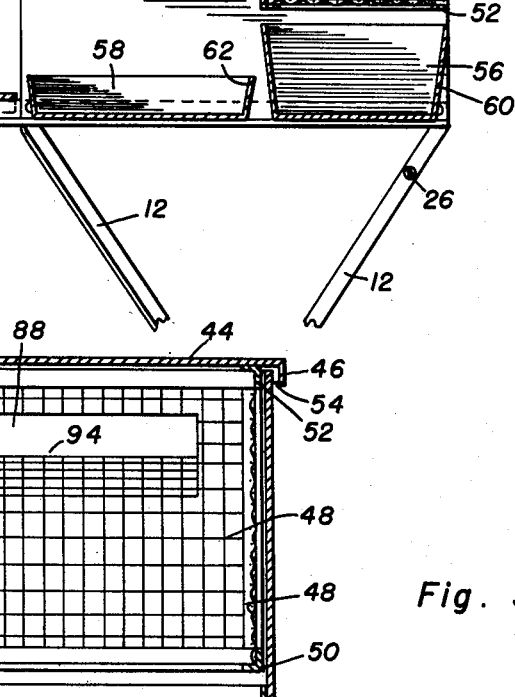
Figure 3 is another vertical sectional view, taken on the line 3—3 in Figure 1.

Referring now to the drawings in detail, it will be noted that the table portion of this device includes a pair of longitudinally disposed angle iron frame members 10, to which are removably secured two pairs of legs 12 which may be also constructed of angle iron. The longitudinally disposed flanges of these legs 12 are joined together by a pivot pin 14, intermediate the ends of the legs, and the upper ends of the legs are provided with offset upstanding flanges 15 which are apertured to receive attaching bolts 16 for coaction with wing nuts 18 whereby these legs are removably secured to the lateral table frame members 10.

It is preferred that the legs 12 will be secured to one pair of corresponding ends of the members 10 and to corresponding points intermediate the ends of these members and that the extending portions 20 of said members be used for the support of a removable shelf 22, this shelf being constructed with depending lateral flanges to engage the extending portions 20. The pivot pins 14 preferably constitute the terminal portions of a rod 24, and another rod 26 is terminally secured to a corresponding pair of legs 12, these rods functioning as spacer members to preserve the legs and members 10 properly spaced apart.

A pair of lateral upstanding plates of rectangular form, designated at 28 and 30 are either rigidly or removably secured to the upstanding flanges of the members 10 of the table. If preferred, the plate 30 is provided with a plurality of longitudinally aligned apertures 32 and the plate 28 is provided with a longitudinal slot 34 having a plurality of depending enlargements 36 which are aligned with the apertures 32. A rotatable skewer comprising an elongated shaft 38 and a plurality of radially disposed tangs 40 rigidly secured to the shaft 38 intermediate the ends thereof, is adjustably securable to the plates 28 and 30, with one projecting end of the shaft 38 inserted through any one of the apertures 32 and the shank portion of the shaft resting in one of the enlargements 36. It will be noted that the shaft 38 terminates in a crank handle 42 whereby the skewer may be rotated and carried, and it will be further noted that the other end of the shaft 38 is preferably sharpened, as are the tangs 40, to facilitate the insertion of the skewer into the meat or other food to be barbecued.

A grill plate 44 of rectangular form and having lateral depending flanges 46 rests upon the top edges of the lateral upstanding plates 28 and 30, the depending flanges 46 acting as guides for the grill plate. It is preferred that the width of this grill plate should be substantially equal to the width of the plates 28 and 30 and it should be carefully noted that the grill plate can be slid rearwardly to provide a shelf at the rear of the device while still covering the fire box 48, or the grill plate may be slid forwardly to cover the skewer and to comprise a grill surface. Obviously, the grill plate 44 may be slid sufficiently forward to allow access to the fire box 48 when it is desired to refuel the device.

The fire box is preferably of oblong shape and constructed of foraminous material marginally reinforced by angle irons 50 on the top, bottom and vertical edges, and the angle iron reinforcements 52 at the top and at the ends of the fire box, are provided with a pair of outwardly and downwardly bent hook flanges 54 which engage the top edges of the plates 28 and 30, thus providing support for the fire box.

An ash pan 56 and a drip pan 58, each of a length adapting the same to be inserted within the lateral plates 28 and 30 and to be terminally supported on the horizontal flanges of the frame members 10, are positioned below the fire box 48 and below the skewer 38, respectively. These pans 56 and 58 are each formed with flaring sides 60 and 62 and are easily removable, the drip pan 58 being used to catch oil and juices expelled from meat being barbecued for use, as in basting.

An oven 64, represented as having rectangular sides, and having a door 66 hingedly secured, as at 68 to the rear side of the oven, and provided with a suitable lock 70 and handle 72, is provided for placement upon the grill plate 44 above the fire box 48. A cover 74 having an arcuate top 76 with a handle 78 and vertical sides 80 is provided to cover the skewer or the forward portion of the grill plate while these devices are being used in order to more effectively retain the heat and to accelerate the cooking operation. The cover 74 is co-extensive with the width of the stove and is provided with depending flanges 82 which hook over the upper edges of the side plates 28 and 30. It may be noted, in this connection, that the upper edges of these side plates are preferably recessed as at 84 and 86, to removably receive the shaft 38 of the skewer.

Figure 4:
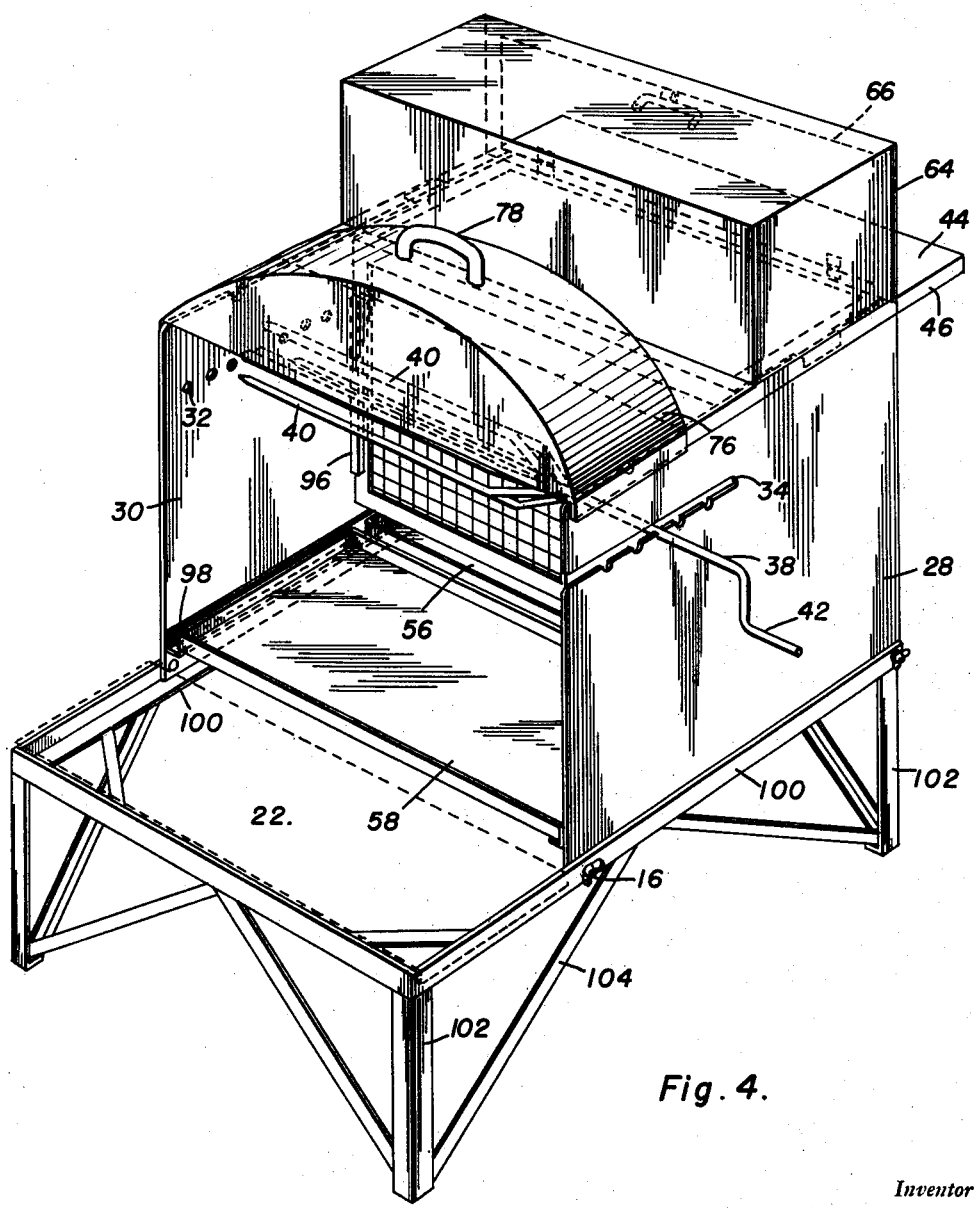
Figure 4 is a perspective view of a preferred modified form of this invention, in which the element hereinafter referred to as the table is in the form of a non-collapsible frame, rather than in the form of a trestle, as illustrated in Figure 1.

The fire box structure includes the flue 88 formed by parting the rear wall of the fire box along a horizontal line 90 and vertical lines 92 and bending the portions 94 outwardly. Vertical guide flanges 96 may be rigidly secured to the side plates 28 and 30 to retain the fire box 48 in position, and horizontally disposed angle iron flanges 98, as shown in Figure 4, may be provided on the inner surfaces of the said side plates 28 and 30 and adjacent the lower edges thereof to terminally support the ash pan 56 and the drip pan 58. If reference be now had to Figure 4, it will be noted that the modified form of this invention shown therein differs only in the structure of the table member. In this modified form, the trestle form of table shown in Figure 1 is replaced by a frame of rigid construction comprising lateral frame members 100 corresponding exactly with the frame members 10 but rigidly mounted upon legs 102 which are secured to the ends of the frame members 100 and braced by angle braces 104. The shelf 22 and the side plates 28 and 30 are mounted upon the frame members 100 in the same manner as the corresponding portions are mounted upon the frame members 10 in the previously described modification.

The method of operation of this invention will be clearly understood from a consideration of the foregoing description of the mechanical details of this invention, taken in connection with the above recitation of the objects sought to be achieved by this invention, but, in recapitulation, it may be noted that the device may be used for baking and the oven 64 is placed on the grill plate 44, used for barbecuing when food is placed on the skewer, and used for grilling food when the grill plate 44 is slid forwardly so that the rear portion thereof covers the fire box 48 and the forward portion thereof extends over the skewer. When the grill plate is in this position, the same becomes sufficiently hot to allow grilling of food at various rates, placed either directly over the fire box 48 or on the portion extending over the skewer, and the cover 74 may be placed over any desired portion of this grill plate. When the grill plate is extended rearwardly, as shown in Figure 1, the same may be used as a grill or as a shelf, and the shelf 22 will at all times be available for use in supporting food in various stages of preparation.

Though there have been described two embodiments of this invention, this application is not limited to these particular embodiments, but it is desired to include in the scope of this invention, the construction, combination and arrangement of parts and portions substantially as set forth in the appended claim.

Having described the invention, what is claimed as new is:

A combined cooker and grill comprising a table, a pair of lateral upstanding plates secured to said table, one of said plates having a horizontal slot with spaced enlargements in said slot, the other of said plates having a plurality of horizontally spaced apertures opposite to said slot, said plates also having opposed skewer receiving recesses in the top edges thereof, a skewer rotatably and detachably mounted on and between said plates and having portions selectively inserted in opposite pairs of said enlargements, apertures and recesses, a fire box having outwardly and downwardly bent hook flanges engaging the top edges of said side plates whereby the fire box is detachably mounted on and between said plates, and a grill plate slidably and detachably mounted on the top edges of said plates and positionable to cover said fire box and said skewer both selectively and simultaneously.

DOMENICO CONTIGUGLIA.

REFERENCES CITED

The following references are of record in the file of this patent:

UNITED STATES PATENTS

| Number | Name | Date |
| --- | --- | --- |
| 902,724 | Giovanna | Nov. 3, 1908 |

(Other references on following page)

UNITED STATES PATENTS

| Number | Name | Date |
|---|---|---|
| 1,639,168 | Dorozynski | Aug. 16, 1927 |
| 1,656,181 | Elbert | Jan. 17, 1928 |
| 1,663,640 | Pais | Mar. 27, 1928 |
| 1,714,536 | Wooderson | May 28, 1929 |
| 1,991,906 | McEvoy | Feb. 19, 1935 |
| 2,021,915 | Hancock et al. | Nov. 26, 1935 |
| 2,335,217 | Tate | Nov. 23, 1943 |
| 2,388,831 | Cramer | Nov. 13, 1945 |
| 2,391,571 | Hennessy | Dec. 25, 1945 |

FOREIGN PATENTS

| Number | Country | Date |
|---|---|---|
| 1,426 | Great Britain | Feb. 22, 1896 |
| 550,218 | Great Britain | Dec. 29, 1942 |
| 572,816 | Germany | Aug. 14, 1931 |